July 16, 1935.  H. A. WHITESIDE  2,008,053
CONTROLLER FOR DENTAL ENGINES AND THE LIKE
Original Filed Sept. 28, 1929  3 Sheets-Sheet 1
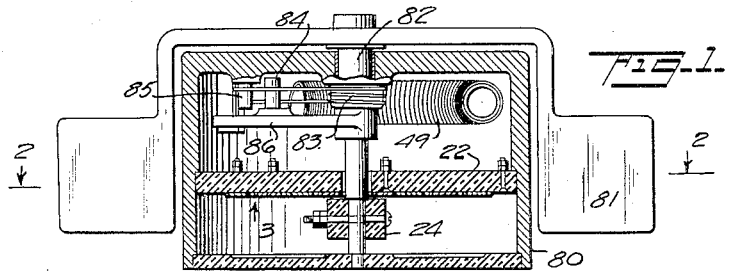
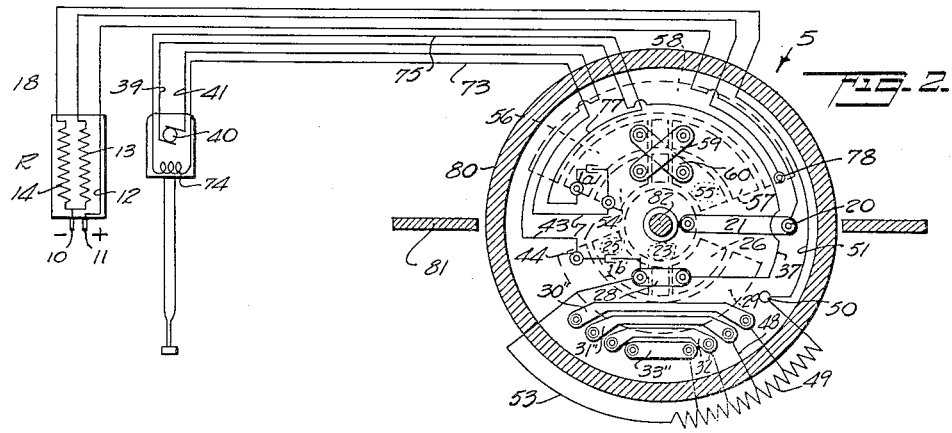
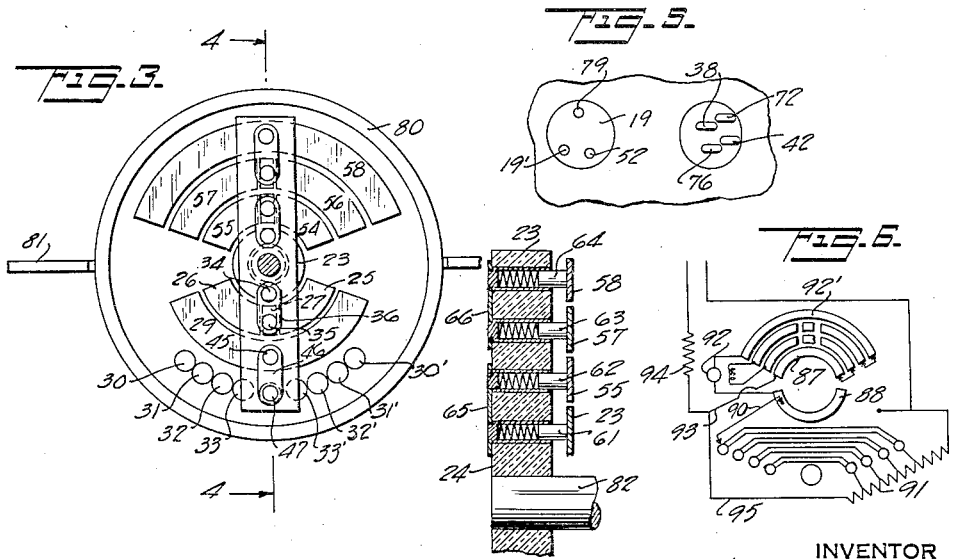
INVENTOR
Howard A. Whiteside
BY
ATTORNEY

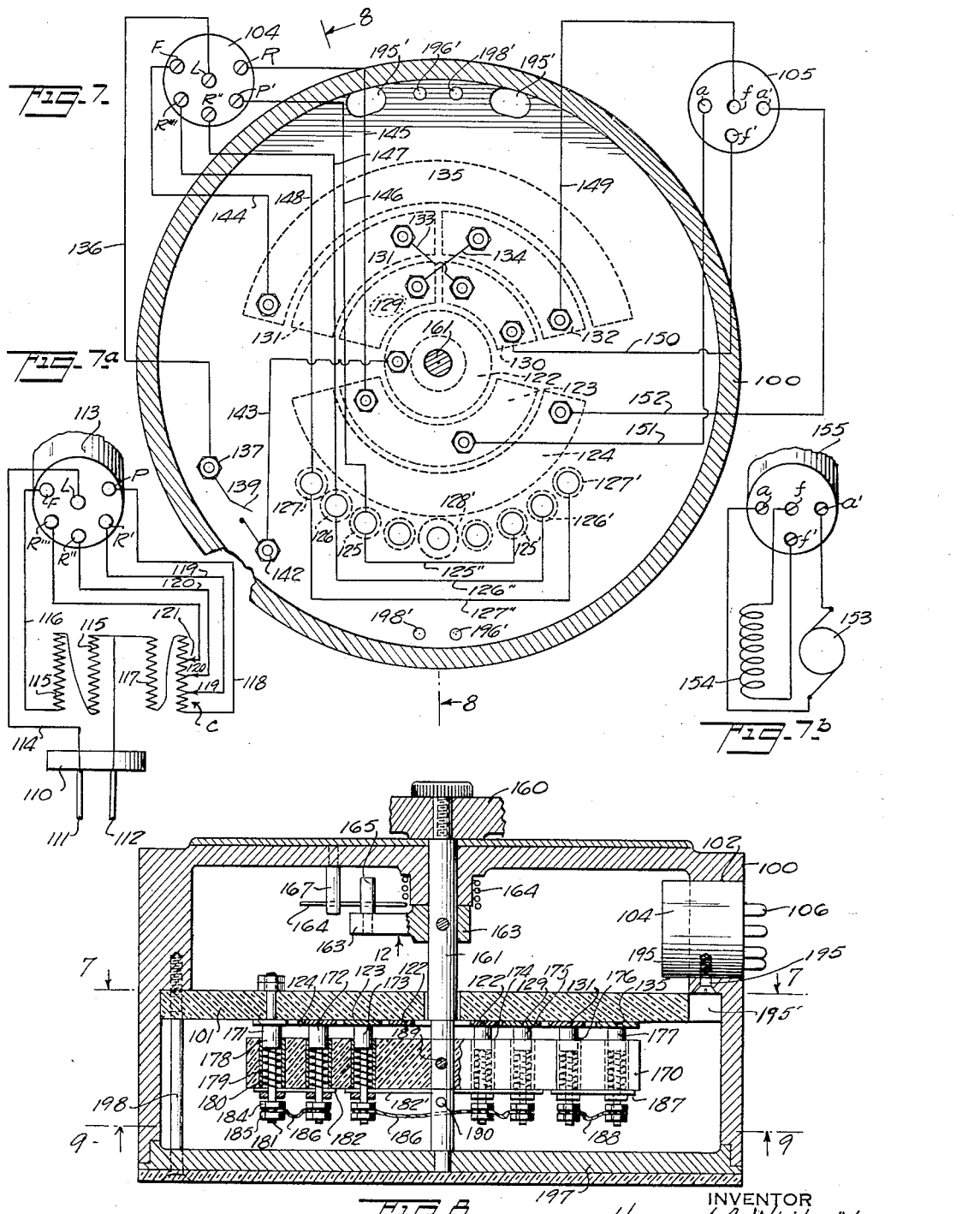

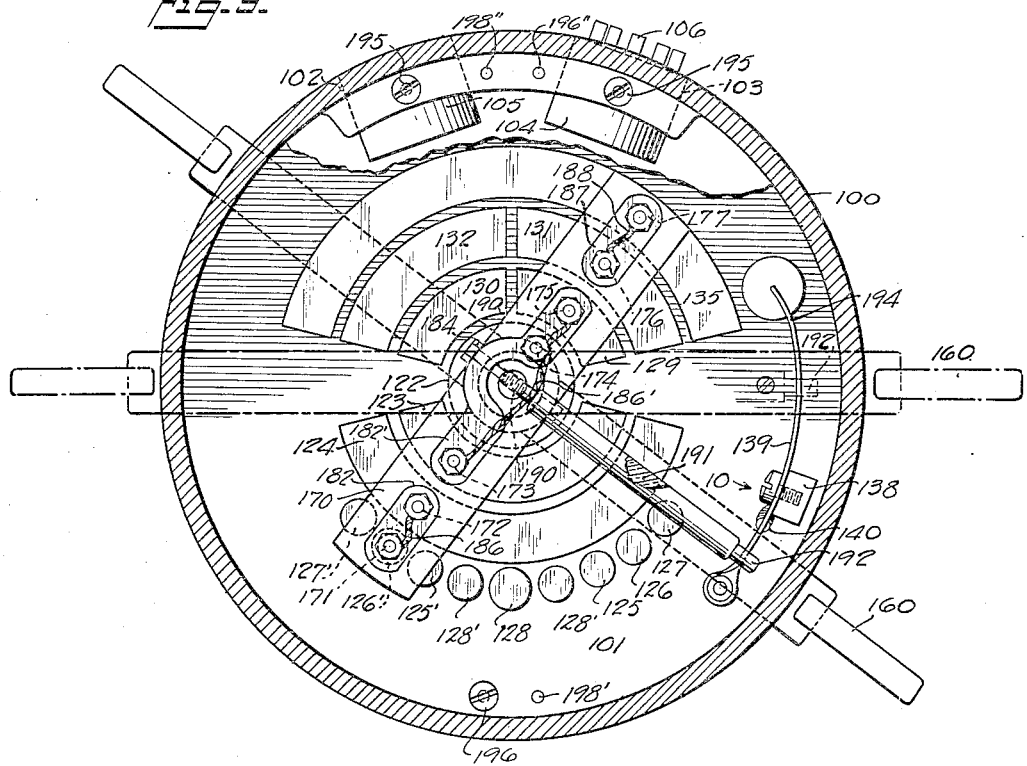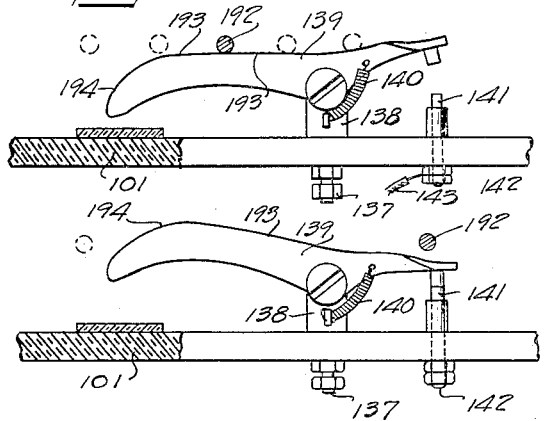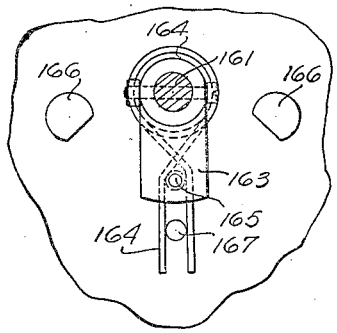

Patented July 16, 1935

2,008,053

UNITED STATES PATENT OFFICE 2,008,053

CONTROLLER FOR DENTAL ENGINES AND THE LIKE

Howard A. Whiteside, New York, N. Y.

Application September 28, 1929, Serial No. 395,978
Renewed March 30, 1934

24 Claims. (Cl. 172—179)

The present invention relates to controllers for dental and surgical engines and the like, and is more particularly directed toward a controller for dental engines employing motorized tool units adapted to be held in the hand while performing surgical operation. The motorized tool units employ an electric motor having field and armature windings and the present controller is more particularly directed for connecting the field and armature windings into the circuit and to control the voltage applied to the armature windings whereby the speed may be varied.

These motors are generally shunt wound and when designed for operation from house lighting alternating current mains, the field and armature circuits are designed so that most of the resistance in the field circuit is non-inductive and external to the motor, and preferably external to the controller proper. Thus the motor field current is comparatively large while the voltage drop inside the motor is comparatively low. For example, a field circuit may use .8 amperes with a voltage drop of about six volts. As the remainder of the field resistance is outside the motor and is non-inductive, the field current has nearly 100% power factor.

In these motors it has been found preferable to supply the armature current through a potentiometer and to control the speed of the armature by varying the tap connections to the potentiometer. For most satisfactory operation, when using 110 volt lighting mains, the circuit is arranged so that the potentiometer bypasses about .3 ampere, and very variable voltage taps are arranged along the potentiometer so as to supply the armature with voltages varying from 20 to 45 volts, although the armature may be wound for higher voltages, but at lower power factor.

These motors are intermittently operated and are preferably controlled by means of a foot controller and a suitable circuit arrangement by which potentiometer, armature and field circuits may be made and broken as desired, to start, stop and reverse the motor and vary its speed. In carrying out these operations, the circuit is made and broken a great many times and according to the preferred form of construction, an auxiliary circuit breaker is interposed in the main line of the controller and arranged to be operated to open and close the circuit before the controller has moved far enough to establish the armature connections. In this manner the field and potentiometer connections are opened and closed by means of the circuit breaker while the armature circuit is open and all arcing and burning is eliminated on the other contacts which control the circuits. The arrangement also insures that the field will be energized longer than the armature and prevents racing the armature.

The accompanying drawings show, for purposes of illustrating the present invention, several of the many possible embodiments in which the invention may take form, it being understood that the drawings are illustrative of the invention rather than limiting the same.

In these drawings:

Figure 1 is a vertical sectional view through one form of foot controller;

Figure 2 is a sectional view taken on the line 2—2 of Figure 1, showing the wiring diagram for controlling a shunt motor;

Figure 3 is a view showing the interior of the controller taken in the direction of the arrow 3 of Figure 1, the bottom plate being omitted;

Figure 4 is a fragmentary sectional view on the line 4—4 of Figure 3 showing the movable contact carrying arm;

Figure 5 is a fragmentary elevational view taken in the direction of the arrow 5 of Figure 2, and showing the plug and receptacle contacts for connecting the controller to the power supply and the motor;

Figure 6 illustrates the contacts and wiring arrangement for controlling a series wound motor with a structure about like that shown in Figures 1 to 5, inclusive;

Figure 7 is a sectional view on the line 7—7 of Figure 8 showing the upper side of a contact carrying plate for a modified form of construction and superposing on this the wiring diagram;

Figures 7a and 7b are diagrammatic views illustrating the wiring of adapter resistance and motor and supply cord used in conjunction with the controller used in Figure 7;

Figure 8 is a section taken on the line 8—8 of Figure 7;

Figure 9 is a view taken in the direction of the arrow 9 of Figure 8 showing the controller in position for supplying current to the motor and in dotted lines showing the parts in the normal open circuit position;

Figure 10 is a view taken in the direction of the arrow 10 of Figure 9 showing the circuit breaker in the open circuit position;

Figure 11 is a view similar to Figure 10 showing the circuit breaker in the closed circuit position; and Figure 12 is a fragmentary view taken in the direction of the arrow 12 to show the return spring and stops for the operating arm.

One form of foot operated controller suitable for dental and surgical engines is shown in Figures 1 to 5, inclusive. This controller is adapted to be placed on the floor convenient for the operator to actuate it by the foot and flexible connections are provided by plugging it to the power supply (which may include a resistance adapter if desired) and to a motorized tool unit, adapted to be held in the hand.

A resistance adapter shown diagrammatically at R has two terminals 10 and 11 by which it may be plugged into a convenience outlet. The adapter has a through connection 12 and two resistance coils 13 and 14 preferably of low inductance. These connections and coils lead to three unsymmetrically located contacts for a plug receptacle (not shown) on a three conductor cord indicated at 18, which may be plugged into the resistance adapter. This cord is provided with a three contact plug by which it may be plugged into a receptacle on the controller as indicated at 19. (Figure 5). The three contacts on the controller indicated at the left of Figure 5 are so arranged that the connections cannot be improperly made. It will, of course, be understood that the resistance adapter may be omitted and the desired resistances disposed in any other convenient fashion.

For convenience, the through connection 12 in the controller is termed positive. The connecting wire in the 3 conductor cord leads to a terminal 19' in the controller receptacle and is there connected to a terminal 20 inside the controller and a strap 21 carried on a fixed insulating plate 22 conducts the current to a centrally placed ring 23. An insulating arm 24 is carried underneath the plate 22 and has contacts adapted to sweep over the lower face of this insulating plate.

As indicated in dotted lines, in Figure 2, and in full lines in Figures 1 and 3, the plate 22 carries segments 25 and 26 adjacent the central contact 23. These segments are separated by an insulated area 27 and are back connected by a strap 28. A longer contact segment 29 is placed outside the segments 25 and 26 and a number of buttons 30, 31, 32 and 33 and 30', 31', 32' and 33' are mounted on the plate outside the segment 29. The contacts 30 to 33, inclusive, and 30' to 33', inclusive, are arranged in pairs and connected by straps 30'', 31'', 32'' and 33''.

The armature side of the circuit may now be traced from the central ring 23 through brushes and back straps 34, 35 and 36 carried on the bar 24 to one or the other of the segments 25 and 26 provided the arm has been moved out of neutral position. The current then passes through the lead 37 to one of the armature terminals carried by the side of the controller as indicated at 38 in Figure 5. The current then passes through a wire 39 in a four conductor flexible cord to the armature 40 of the motor and then returns from the armature through a wire 41 in the cord to the other armature terminal 42 on the side of the controller. It then passes through wiring 43 inside the controller to a button 44 carried on the outer long segment 29. The current then passes through a brush 45 back contact 46, and brush 47, all of which are carried by the bar 24, into one or the other of the pairs of buttons 30' to 33', inclusive. The buttons 30' to 33', inclusive, are connected by taps 48 to a resistance coil indicated at 49 and mounted inside the controller. The current passes through this resistance coil to a button 50, then by lead 51 to the terminal 52 carried by the controller. The current then returns through the 3 conductor flexible cord previously referred to and through the resistance 14 to the opposite side of the line.

As shown in the drawings, a connection 53 is made from the strap 28 on the end of the resistance coil 49. This connection places the resistance coil 49 in circuit at all times when the controller arm is moved out of neutral position, and permits potentiometer control of the armature current. The omission of this lead 53 makes the device a straight series resistance control.

The field side of the motor connections is also carried by the insulating plate 22 and as viewed in the drawings is on the opposite side of the axis of the controller. The segments 54 and 55 are placed close to the ring 23, while segments 56 and 57 are placed just outside the segments 54 and 55. Outside the segments 55 and 57, a longer segment 58 is placed. The segments 54 and 57 are cross connected by a strap 59 and the segments 55 and 56 are cross connected by a strap 60. The movable arm 24 is provided with brushes and straps as indicated in Figures 3 and 4. They may include four brushes indicated at 61, 62, 63 and 64 and two back straps indicated at 65 and 66.

The current may be traced from the inner segment 54 through the lead 71 to a terminal 72 on the controller, thence through a wire 73 in the four-conductor cord to the motor field 74 and returning from the motor field through a conductor 75 to the other field terminal 76 on the controller; thence to the wire 77 in the controller to the segment 56 and through the jumper 66 and brushes 63 and 64 on the arm 24 to the segment 58; thence from terminal 78 through the wiring in the controller to the field connection terminal 79 of the controller and through the three conductor flexible cord to the resistance coil 13 as indicated. To reduce sparking small condensers 1a and 1b are connected in the controller.

The insulating plate 22 is carried in a housing 80 and a foot operated arm 81 is pivotally mounted on the top of this casing and operably connected to a shaft 82 which extends down into the casing through the plate 22 and carries the swinging arm 24 in a position to sweep the brushes across the contacts carried by the plate 22. The resistance coil 49 may be conveniently mounted above the plate 22 and space is also provided for a spring 83 which cooperates with pins 84 and 85 carried by the casing and by an arm 86 attached to the shaft, respectively, so that the spring will return the foot lever to the neutral position when pressure is removed from it.

Where the motor is to be used on power mains such as 110 volt house lighting mains, the motor field 74 is preferably designed to use but a very small part of the line potential, the most of the voltage drop being non-inductive in the field resistance coil 14 in the resistance adapter. In this manner the power factor of the motor field circuit may be kept relatively high. Where the motor is designed for use on such circuits, the armature may be designed to take up to the full 110 volts and to operate on part of this potential, tapping it off the potentiometer resistor. It is desirable, however, to use only part of the line potential preferably less than 45 volts. The selected voltages are then applied to the motor by the controller to control the speed.

While the description above given relates to circuits for, and the control of a shunt wound motor, it is really possible to control a series wound motor by substantially the same controller and to supply substantially the same surgical outfits with series motor. Figure 6 indicates the connections for the series motor. In a foot operated controller, the parts are arranged similar to those shown in Figures 1 and 5 inclusive. The coil characteristics and resistances will, of course, be designed according to the motor being controlled. Instead of using a central ring 24 one may now employ a split ring having segments 87 and 88 and may dispense with the outer segment 29 on the armature side. The jumper 90 is designed to reach from the ring 87 to the buttons 30, etc. so as to connect the series resistance 91 into the circuit. The current then passes from the segment 88 to the armature 92 of the motor to the outer segment 92', corresponding with segment 58, and through the field side of the motor and field side of the controller in the same fashion as heretofore described returning from the segment 87 through a connection 93 to the other terminal of the controller which may be connected to the line through a series resistance 94 if desired. If it is desired to use potentiometer control of a series motor, connection 95 is made from the resistance 91 across to the controller terminal.

It will, of course, be understood that in all these outfits the proportioning of and disposition of the various resistances will be dependent upon the characteristics of the motor, the voltage of the power supply, and other variables. The accurate determination of these variables is essential to secure satisfactory operation.

The controller shown in Figures 8 to 12, inclusive, is made up along somewhat the same lines as that heretofore described in detail, but is arranged so that all of the field and armature resistances may be carried outside the controller, itself thereby eliminating heating in the controller body, and permitting the design of an adapter resistance which readily dissipates the heat.

This improved type of controller also has a circuit breaker arranged in the line circuit so that the circuit is opened and closed by a quick movement instead of being closed by the slow moving brushes on the segments, thereby keeping these stationary contacts and brushes from corrosion due to arcing when the circuit is opened.

The controller body is indicated at 100. It is open at the bottom and is adapted to receive an insulating plate 101 which carries the stationary contacts. The controller body also has side openings indicated at 102 and 103 to receive a multiple conductor plug 104 and a multiple conductor receptacle 105 by which the controller is connected to the current supply and to the motor by flexible cables. The controller plug for the supply line is preferably a six conductor plug having six projecting split pins indicated at 106 in Figures 8 and 9. These split pins may be designated for convenience by the letters —P— for potentiometer, —L— for line, —F— for field, and —R'—, —R''—, and —R'''— for the resistance connections. The output receptacle 105 for the motor preferably has four receptacle contacts designated for convenience as $f$, $f'$, $a$ and $a'$. In each case, the contacts are asymmetrically arranged so as to insure proper connections when the parts are assembled.

The circuit for the current supply to the controller is indicated in Figure 7a. This may conveniently be in the form of an adapter resistance, which forms the subject matter of an application executed and filed concurrently herewith. The circuit of this adapter resistance may include a plug 110 carried at one end and having two conventional blade contacts 111 and 112 whereby it may be plugged into an ordinary convenience outlet. The adapter resistance preferably carries in the other end, a six conductor receptacle indicated diagrammatically at 113. This receptacle plug corresponds with the male plug 104 carried by the controller and these parts are connected together by a flexible cord or cable. The output receptacle contacts on the adapter are designated by the letters —P—, —L—, —F—, —R'—, —R''— and —R'''— corresponding to the same letters used on the input plug on the controller. The line terminal —L— is connected directly with the blade 111 of the adapter resistance by a conductor indicated at 114. The other blade 112 of the adapter resistance is connected to resistance coils for the field circuit indicated at 115, and by wire 116 with the field terminal —F—. The blade 112 is also connected through a resistance coil 117 with a wire 118 which leads to the potentiometer terminal —P—. The resistance terminals R', R'' and R''' are connected by wires 119, 120 and 121 with selected points on the potentiometer resistance coil 117.

In the controller proper, all of the wiring between the input plug and output receptacle is accommodated in the chamber above the insulating plate 101. This plate carries on its lower face an arrangement of segments and conductor buttons similar to that shown in Figures 2 and 3 except that the segments are not provided with a separator for open circuit conditions, the circuit being opened by an additional circuit breaker carried by the insulating plate.

The insulating plate carries a central ring 122, two armature segments 123 and 124 and outside the armature segments are placed buttons 125, 126 and 127 connected to buttons 125', 126' and 127' by means of back connections 125'', 126'' and 127''. Intermediate the buttons 125 and 125' are placed three "dead" buttons 128 and 128'. On the opposite side of the ring 122, the insulating plate 101 carries inner field segments 129 and 130 and outer field segments 131 and 132 cross connected by conductors 133 and 134. Outside the segments 131 and 132 is placed an outer field current supply segment 135. These segments and buttons are all permanently secured to the insulating disk or plate 101.

The connections for the circuit breaker include a wire 136 which leads from the line terminal —L— of the input plug to a binding post 137 on the upper face of the insulating plate 101. This binding post is connected to a breaker arm support 138 carried on the lower face of the insulating plate 101. This breaker arm support carries a pivotally mounted lever or arm 139 biased toward closed circuit position by a spring 140. The other fixed terminal of the circuit breaker is indicated at 141. It is connected to binding post 142 carried in the upper surface of the plate 101, and this binding post 142 is connected by a wire 143 with the inner ring 122 of the controller. The other permanent connections between the input plug and the stationary contacts include as indicated in Figure 7, a wire 144 connecting the field and the terminal —F— with the field ring 135, a wire 145 connecting the potentiometer terminal —P— with the segment 123 and wires 146, 147 and 148 connecting the terminals —R'—, —R''— and —R'''— with the buttons 125, 126 and 127.

The output connections carried by the controller include a wire 149 leading from the segment 132 to the field terminal —f—, and a wire 150 leading from the segment 130 to the field terminal —f'—. The armature segments 123 and 124 are connected to the armature terminals a and a' by wires indicated at 151 and 152. The motor windings as indicated in Figure 7b include an armature 153 connected to armature terminals a and a' and a field winding 154 connected to terminals f and f'. It will be understood that the field and armature 153 and 154 are connected by a four conductor cord or cable with plug 155 adapted to fit into the receptacle 105.

The movable contacts in the controller are under the control of a foot lever 160 similar to the foot lever 81. This lever is connected to a central shaft 161 similar to the shaft 82. The shaft 161 carries an arm 163 and a coiled spring 164. This spring is placed on opposite sides of a pin 165 extending upwardly from the arm 163. The controller body 100 carries fixed stops 166 and a pin 167. These parts cooperate to limit the extent of movement of the foot lever and to return it to normal position whenever the foot is removed from the controller arm.

The shaft 161 carries a movable contact carrier 170 generally similar to the contact carrier 24. This carrier is made of insulating material and carries seven brushes 171, 172, 173, 174, 175, 176 and 177.

These brushes may be alike and as here shown may be in the form of metal plungers 178 carried in metal tubes 179 and pressed upwardly by springs 180. The reduced diameter portion 181 of the plunger passes through a back connection strap 182 and is threaded at the end as indicated at 183. This threaded end carries a nut 184 and a nut 185 between which is clamped a pig tail connection such as indicated at 186. The brushes 171 and 172 are connected by the back connection 182 and the pig tail 186. The brushes 173, 174 and 175 are connected together by a back strap 182' and pig tail 186'. The brushes 176 and 177 are connected together by a back strap 187 and pig tail 188.

This brush carrier is secured in position on the shaft 161 by a bolt indicated at 189. This bolt acts to place the contact carrier in the proper angular position on the shaft and takes the thrust produced by the springs for the brush contacts. The shaft 161 is drilled and tapped below the insulating contact carrier as indicated at 190 to receive a stud carried by an insulating rod 191. This insulating rod carries a pin 192 in its free end and this pin is adapted to ride over the upper surface 193 of the circuit breaker arm 139.

When the controller is in the "off" position, the foot lever 160 and contact carrier are in the dotted line position indicated in Figure 9. It will be noted that at this time, the pin 192 on the circuit breaker arm is along the middle part of the arm, being in the position indicated in dotted lines. This corresponds with the full line position of this pin as indicated in Figure 10 and it will be noted that in this position the line circuit is open between the circuit breaker arm 139 and the stationary contact 141.

From an examination of the wiring diagram of Figure 7, it will be apparent that all the circuits are open and no current can flow through the field or potentiometer resistance or the field or armature of the motor. When the controller is in this position the brush 171 is on the "dead" button 128.

Assuming now that the controller arm is being pushed in a counter-clockwise direction as indicated in Figure 9, the brush carrying member 170 will carry the brushes from the dotted line position toward the full line position. This will first bring the brushes 175 and 176 onto the field segments 130 and 132 thereby completing the motor field circuit as soon as the foot controller arm is operated, except for the operation of the circuit breaker 139. The brush 171, however moves onto the "dead" button 128' and as yet has not completed the armature circuit or potentiometer circuit. During this movement, the circuit breaker operating pin 190 is moved to the right as indicated in Figure 10 and comes to the position of the first dotted circle at the right. Continued movement of the pin 192 to the right brings it beyond the upper surface of the circuit breaking arm and permits the spring 140 to close the circuit breaker bringing the arm 139 to the position indicated in Figure 11. This closes the circuit for the field and potentiometer.

As soon as the operating lever is moved far enough to bring the brush 171 onto the button 125', the circuit for the motor armature is established tapping it into the connection R' and applying the voltage drop in the portion C of the potentiometer. The circuit breaker operating arm 192 then continues to move to the right as indicated in Figure 11 and has no effect on the circuit breaker as the controller is moved back and forth to vary the motor speed. As soon, however, as pressure of the foot is removed from the foot controller arm the spring 164 acts to return the parts to neutral position. This will swing the arm 192 back toward the neutral position and the parts are so proportioned that this pin engages with the upper surface of the circuit breaker arm to force the circuit breaker arm to open position, just as the brush 171 is leaving the armature button 125'. This therefore opens the circuits for the field, the armature and the potentiometer and insures that the field circuit cannot remain closed after the armature circuit has been opened.

When the motor is to be reversed, the controller is actuated to turn the parts in the other direction. This brings the buttons 175 and 176 onto the segments 129 and 131 thereby reversing the connections to the field, and the armature connection brush 171 sweeps across the buttons to the right of the center of Figure 9. During this movement, the pin 192 moves to the left as indicated by the dotted circles in Figure 10. The upper surface 194 of the free end of the circuit breaker 139 is cam-shaped as indicated and is so shaped and the parts so proportioned that the circuit breaker is held in open position until the brush 171 is well over on the dead button 128' and then the pin 192 passes beyond the arm 194 and permits the spring 140 to close the circuit. The circuit remains closed until pressure is removed from the foot pedal and the spring 164 again returns it to the open circuit position. During this return, the pin 191 strikes the upper cam surface 194 and actuates the circuit breaker to open position, this actuation taking place in the same manner as previously described.

It will be noted that this circuit breaker arrangement eliminates the possibility of burning or arcing of the other contacts of the controller and makes it possible to transfer the circuit breaking operation to a single pair of contacts which may be designed for the purpose. These contacts are accessible for replacement without making it necessary to take the controller apart or disturb the upper, inner connections.

In the assembly of the controller, all the fixed contacts for the circuit breaker are mounted on the insulating plate. The plug 104 and receptacle 105 are permanently secured to the plate by suitable wires, preferably soldered connections being employed. The receptacle and plug are passed out through the openings in the wall of the controller and are secured in place by screws 195 threaded into the insulating body of the receptacle and plug. These screws pass through cut outs 195' in the plate. The insulating plate 101 is secured in place by screws 196, passing through holes 196' in the plate and into holes 196'' in the controller body. The movable contact carrier and circuit breaker arm are then secured in place, and the device may be tested. The controller is closed at the bottom by a plate 197 held in place by screws 198 passing through holes 198' in the plate and threaded into holes 198' in the controller body.

The present application is a continuation in part of my copending application Serial Number 113,885 filed June 5, 1926.

It is obvious that the invention may be embodied in many forms and constructions, and I wish it to be understood that the particular forms shown are but a few of the many forms. Various modifications and changes being possible, I do not limit myself in any way with respect thereto.

I claim:

1. A controller for a motor with the usual field and armature, said controller having resistances and cooperative fixed and movable field circuit contacts and armature circuit contacts for controlling the direction and amount of current supplied to the motor field and the potential applied to the motor armature, and a circuit breaker connected in series with the field circuit contacts and operable by means moving with the movable contacts but independently thereof for partially completing the circuit through the field circuit contacts before the armature circuit contacts are brought together and for suddenly opening the said circuit after the circuit of the armature circuit contacts is opened, said circuit breaker relieving the motor field contacts from arcing.

2. A controller as claimed in claim 1, having spring operated means to return the movable contacts to neutral position to disconnect the armature, and wherein the circuit breaker is opened by the contact return means.

3. A controller as claimed in claim 1, having a potentiometer circuit off of which the armature current is tapped, said potentiometer circuit being completed by the circuit breaker simultaneously with the field circuit.

4. A controller for a motor with the usual field and armature, said controller having resistances and cooperative fixed and movable field circuit contacts and armature circuit contacts for controlling the direction and amount of current supplied to the motor field and the potential applied to the motor armature, the movable contacts being carried by an oscillating arm having a normal position in which the armature circuit contacts are separated, and a circuit breaker operable by means moving with the arm for positively and suddenly making or breaking the circuit through the field circuit contacts while the armature circuit contacts are separated to relieve the field circuit contacts from arcing.

5. A controller as claimed in claim 4, wherein the circuit breaker is spring biased toward closed position and is opened by the movement of the arm, the parts being timed to separate the field circuit contacts after the armature circuit contacts are separated.

6. A controller as claimed in claim 4, wherein the arm is movable in either direction from said normal position to select the resistance in circuit with the armature circuit contacts and to reverse the relative direction of current for the field circuit, the circuit breaker being timed to establish the circuit through the field circuit contacts after the polarity relation of the field circuit has been fixed.

7. A controller for a motor with the usual field and armature, said controller having armature and field resistances adapted for connection to one side of the power supply line, a circuit breaker adapted for connection to the other side of the line, cooperative fixed and movable field circuit contacts in series with the field resistances for reversing the connections so that the direction of current flow to the motor field may be predetermined and for completing the portion of the circuit for the motor field through field resistance and to the inner side of the circuit breaker, circuit breaker actuating means movable with the movable contacts, and cooperative fixed and movable armature circuit controlling contacts adapted to connect the armature to the armature resistance and the inner side of the circuit breaker, the circuit breaker being arranged to be closed before the armature circuit controlling contacts are brought together and to be opened after the armature circuit controlling contacts are separated.

8. A controller as claimed in claim 7, wherein the armature resistances are included in a potentiometer connection between the circuit breaker and the opposite side of the line.

9. A controller as claimed in claim 7, wherein the movable contacts are carried on an oscillating arm, and a spring acts on the arm to return the arm to move it to a position where the movable contacts are separated from the fixed contacts and to bring the arm against the circuit breaker to open the circuit breaker.

10. A motor controller, comprising a downwardly opening casing having a top wall, an insulating contact carrying plate disposed across the casing to form a closed wiring chamber between the plate and top wall, a plurality of contacts adapted for connection to a motor field and a motor armature and carried on the lower face of the plate, stationary input and output wiring connections above the plate and extending out through the casing wall so that all the wiring connections are in said chamber, a shaft extending through the top wall and plate and carrying a movable contact carrier below the plate, said carrier having contacts cooperative with the stationary contacts, whereby the movable and stationary contacts may be inspected without disturbing the wiring above the plate.

11. A motor controller, as claimed in claim 10, wherein the contact carrier is removable from the shaft as a unit, and the insulating plate is removable as a unit when the contact carrier is off the shaft.

12. A motor controller, as claimed in claim 10, having spring means which biases the shaft and carrier toward normal open circuit position and wherein the contacts are arranged for reversing the direction of the motor field current when the shaft is out of normal position and for supplying variable voltages to the armature according to the distance the shaft is moved.

13. A motor controller, as claimed in claim 10, having a circuit breaker below the plate held open while the shaft is in certain positions and closed when the shaft is in positions which place the contacts in position to close the armature circuit.

14. A motor controller, as claimed in claim 10, having means to bias the shaft and carrier toward neutral open circuit position, and having a circuit breaker biased toward closed position and held in open position when the shaft is in a predetermined range of movement and released so as to close only when the shaft is beyond said range of movement.

15. A controller for dental and surgical engines, comprising an outer casing opening downwardly, an operating foot lever secured to a vertical shaft and having depending foot engageable extensions, a horizontal insulating contact carrying plate in the casing, a multiple conductor current supply tap, a four conductor output receptacle, the tap and receptacle being disposed in the casing wall and accessible for extension cords to connect the controller to a motor and to two separate supply sources, one for an armature circuit and the other for the field circuit, the shaft extending through the plate and carrying a plurality of movable contacts cooperative with stationary contacts on the lower face of the plate for completing the connections for starting, stopping and reversing the motor.

16. A controller for dental and surgical engines, as claimed in claim 15, having a plate carried circuit breaker in the supply line for all the circuits, and biased toward closed position, and a circuit breaker operating arm carried by the shaft and holding the circuit breaker open during a predetermined range of movement of the shaft.

17. A controller for dental and surgical engines, as claimed in claim 15, wherein the movable contacts are spring pressed, arranged in pairs connected together, and are carried on an insulating bar detachably secured to the shaft.

18. A controller for dental and surgical engines, as claimed in claim 15, wherein the tap and receptacle are permanently connected with contacts on the plate.

19. The combination with a motor controller having circuits and connections to a plurality of stationary field circuit contacts and armature circuit contacts and cooperative movable field circuit contacts and armature circuit contacts moving in unison and adapted to open and close the field and armature circuits of a motor to start, stop, reverse and control the speed of the motor, and means to normally move all the movable contacts toward circuit opening position to stop the motor, of a circuit breaker in the circuit for both the field circuit contacts and the armature circuit contacts and biased toward closed position, and means movable with all the movable contacts for actuating the circuit breaker toward open position after the armature circuit contacts are separated when stopping the motor.

20. A motor controller as claimed in claim 19, wherein the circuit breaker is common to the circuits for the field circuit contacts and the armature circuit contacts, and wherein the circuit breaker actuating means allows the field circuit contacts to close before the armature circuit contacts are brought together when starting the motor.

21. A motor controller as claimed in claim 19, wherein the circuit breaker has an actuating cam engageable by the means movable with the movable contacts, said means moving beyond the cam so that the field circuit contacts may be brought together before the armature circuit contacts are brought together.

22. A motor controller comprising a stationary insulating contact support and a movable contact carrier, the stationary contact support having on the face thereof a plurality of contacts including two pairs of cross connected segments, another segment outside the cross connected segments, a ring inside the cross connected segments, another pair of segments outside the ring and opposite the cross connected segments, and a plurality of conducting buttons and an insulated button outside the outer segment of the second pair, the movable contact carrier having spring pressed brushes engageable with the stationary contacts, and bridging members interconnecting the brushes, one brush bearing on the segment outside the cross connected segments and being connected by a bridging member to a brush which bears on one or the other of the outer segments of the first pair of segments, another brush bearing on the ring and being connected by a bridging member to a brush which bears on the one or the other of the inner segments of the first pair of segments, and to a second brush which bears on the inner segment of the second pair of segments, still another brush bearing on the outer segment of the second pair of segments and being connected by a bridging member to another brush which bears on the conducting or insulating buttons.

23. A motor controller as in claim 22, wherein the insulating contact support is mounted in a casing whose walls support an outlet receptacle having four terminals, one connected to one inner segment of the cross connected pair, another connected to an outer segment of the cross connected pair, another connected to the inner segment of the second pair and another connected to the outer segment of the second pair, and an input receptacle having three contacts, one connected to the ring, another to the segment outside the pairs of cross connected segments, and another to said buttons through resistances.

24. A motor controller, as claimed in claim 22, wherein the insulating contact support is mounted in a controller body which carries a multiple conductor input tap whose terminals are interiorly connected with the inner ring, the segment outside the cross connected segment, and the respective conducting buttons, said controller body also carrying an output receptacle having terminals each connected to one of the remaining segments.

HOWARD A. WHITESIDE.